(12) United States Patent
Kehder et al.

(10) Patent No.: US 7,043,461 B2
(45) Date of Patent: May 9, 2006

(54) PROCESS AND SYSTEM FOR DEVELOPING A PREDICTIVE MODEL

(75) Inventors: Matthias Kehder, Amesbury, MA (US); David Dillon, Newburyport, MA (US)

(73) Assignee: Genalytics, Inc., Newburyport, MA (US)

( * ) Notice: Subject to any disclaimer, the term of this patent is extended or adjusted under 35 U.S.C. 154(b) by 284 days.

(21) Appl. No.: 09/863,175

(22) Filed: May 23, 2001

(65) Prior Publication Data

US 2003/0004903 A1    Jan. 2, 2003

Related U.S. Application Data

(60) Provisional application No. 60/263,024, filed on Jan. 19, 2001.

(51) Int. Cl.
*G06F 15/18*    (2006.01)
*G06N 3/00*    (2006.01)
*G06N 3/12*    (2006.01)

(52) U.S. Cl. ............................. 706/13; 706/12; 706/14
(58) Field of Classification Search ................. 706/12, 706/13, 14
See application file for complete search history.

(56) References Cited

U.S. PATENT DOCUMENTS

| | | |
|---|---|---|
| 5,136,686 A | 8/1992 | Koza |
| 5,343,554 A | 8/1994 | Koza et al. |
| 5,390,282 A | 2/1995 | Koza et al. |
| 5,742,738 A * | 4/1998 | Koza et al. ................... 706/13 |
| 6,058,385 A * | 5/2000 | Koza et al. ................... 706/13 |

OTHER PUBLICATIONS

Zbigniew Michalewicz et al, GENOCOP: A Genetic Algorithm for Numerical Optimization Problems with Linear Constraints, ACM, vol. 39, Issue 12es.*
"Approximation Techniques for Variations of the p-Median Problem", by Cory J. Hoelting et al., Symposium on Applied Computing, Proceeding of the ACM Symposium on Applied Computing, published by ACM Press, New York, NY, 1995, pp. 293-299.
"GENOCOP: A Genetic Algorithm for Numerical Optimization Problems with Linear Constraints", by Zbigniew Michalewicz et al., Communications of the ACM, published by AMC Press, New York, NY, 1996, vol. 39, issue 12es, pp. 1-27.

* cited by examiner

*Primary Examiner*—Joseph P. Hirl
(74) *Attorney, Agent, or Firm*—Bachman & LaPointe, P.C.

(57) ABSTRACT

The present invention relates to a computer implemented process for developing a model which predicts the value of a single dependent variable based on the value of at least one independent variable. The process comprises the steps of creating a dataset containing a plurality of observations each containing a value for the dependent variable and values for the at least one independent variable, creating from the dataset a plurality of original chromosomes each comprising a possible predictive model, developing a quantitative fitness measure for each chromosome, and creating a new generation of chromosomes by selecting a number of the original chromosomes based upon the fitness measures, crossing the selected original chromosomes by at least one of a cloning and a pure (standard) crossover technique, and mutating the crossed chromosomes. A system for carrying out the process of the present invention is also described.

43 Claims, 7 Drawing Sheets

US 7,043,461 B2

PROCESS AND SYSTEM FOR DEVELOPING A PREDICTIVE MODEL

CROSS REFERENCE TO RELATED APPLICATION(S)

The present application is related to and claims the benefit of provisional U.S. patent application Ser. No. 60/263,024, filed Jan. 19, 2001, entitled ANALYTICAL AUTOMATION OF STATISTICAL AND NEURAL NETWORK MODEL BUILDING.

BACKGROUND OF THE INVENTION

The present invention relates to a process and a system for developing a model which predicts the value of single or multiple dependent variable(s) based on the value of one or multiple independent variables. The present invention also relates to a unique chromosome structure used in the process.

Although the analytical process of applying statistical (S) and neural network (NN) models to e-commerce business-to-business and business-to-customer marketing applications is very useful, the process has two major problems. The first problem lies with the creation of the analytical variables needed to accurately represent the marketing problem. Currently, this process requires a statistical expert and is very time consuming.

The second problem lies in the sheer number of different combinations of variables that can be included in a model. As a simple example, assume an analysis requires the selection of 15 variables from a data set of 50 variables. This process would generate 2.25 trillion combinations of variable data sets. As tasks become more complex so does the analysis. Consider a moderately complex task of creating a logistic regression model, which is to be built from a data set that consists of 1000 independent variables. The number of valid model combinations would be incredibly large, requiring an enormous, time consuming effort. In addition to the complexity of the shear number of variable combinations that may need to be generated, there exists the added complexity of conditions. For example, NN models require structural optimization, i.e. identifying the hidden nodes and hidden layers. Since independent variables are used to predict the dependent variables and hence the outcome, the independent variables need to be selected carefully. This added requirement of structural optimization would produce a number of variable combinations that would be staggering. As a very simple example of the task required for a constraint (small) NN and using the values above, the number of variable combinations that can be generated by choosing 15 variables from a list of 50, and determining between one and two hidden layers, with each hidden layer having a choice of up to 25 hidden nodes, is incredible. In fact, an actual application of a moderately sized neural network would increase the number of possible combinations significantly. Again as the model complexity grows, the number of variable combinations for these types of problems becomes so large that, with current computer CPU speeds, it is almost impossible to test every single model combination within a reasonable timeframe, especially for larger commercial problems. In addition, models and data sets both suffer from decay. This means that the data becomes out of sync with the business problem at hand during the exhaustive search. For this reason, a solution found by an exhaustive search will most likely not be optimal anymore by the time the solution is found. Although correlation analysis techniques can be used to narrow down the variables to a more acceptable (and reasonable) number (Pearson's correlation may be used to determine the 15 strongest correlations against the dependent variable), traditional statistical techniques have one major inherent flaw—the moment the number of variables is reduced, a large part of the analytical solution space is eliminated. If the best solution consists of variables that correlation analysis did not select, the variable selection process will have kept the statistical process from ever finding the best, or optimum, solution.

Furthermore, there are still close to an infinite number of independent variable transformations and manipulations that can be applied to each independent variable. Additionally, interaction terms, or terms that are the product of two independent variables, need to be identified. This is because these terms reveal complex behavior in combination with each other, but not individually. The problem is finding the right transformations, manipulations, and interactions for the independent variables in order to accurately describe the variance of a dependent variable, simultaneously.

Consequently, a need exists for an analytical method of applying statistical (S) and neural network (NN) models to e-commerce, business-to-business, and business-to-customer marketing applications that optimizes the process of determining data transformations, manipulations, and interactions for independent variables in order to accurately describe the variance of a dependent variable.

SUMMARY OF THE INVENTION

Accordingly, it is an object of the present invention to provide an evolutionary process for developing a predictive model.

It is another object of the present invention to provide a process as above which is capable of analyzing large volumes of operational or demographic data and produce a near optimum predictive model.

It is a further object of the present invention to provide a process as above which maps statistical ideas to genes.

It is still another object of the present invention to provide a system for performing the process of the present invention.

The foregoing objects are attained by the process and the system of the present invention.

In accordance with the present invention, a computer implemented process for developing models which predict the value of a single dependent variable based on the value of at least one independent variable is provided. The process broadly comprises the steps of (a) providing a dataset containing a plurality of observations each containing a value for the dependent variable and values for the at least one independent variable, (b) creating from the dataset an initial generation of chromosomes each comprising a possible predictive model, (c) determining a quantitative fitness measure for each of said chromosomes in the initial generation, and (d) creating a next generation of chromosomes by selecting a number of the chromosomes in the initial generation, crossing the selected initial generation chromosomes by at least one of cloning and a crossover technique, and mutating the crossed chromosomes. Steps (c) and (d) of the process are repeated for a number of iterations to create a generation of chromosomes which provides a near optimum result.

A system for performing the process of the present invention broadly comprises means for creating an initial generation of chromosomes from a dataset with each chromosome in the initial generation comprising a possible predictive model, means for determining a quantitative fitness measure for each chromosome in the initial generation; and means for selecting a number of initial generation chromosomes, for crossing the selected initial generation chromosomes by at least one of cloning and a crossover technique, and for mutating new chromosomes.

Other details of the process and the system of the present invention, as well as other objects and advantages attendant thereto are set forth in the following detailed description and the accompanying drawings wherein like reference numerals depict like elements.

DETAILED DESCRIPTION OF THE PREFERRED EMBODIMENT(S)

Figure 1:
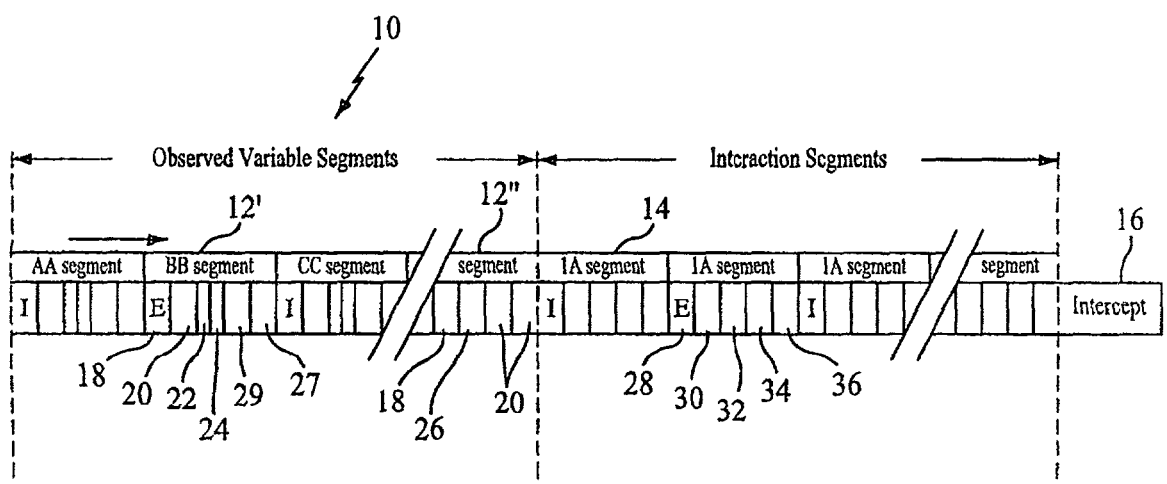
FIG. 1 is a schematic representation of the structure of a chromosome formed in accordance with the process of the present invention.

As previously mentioned, the present invention relates to a computer implemented process for developing a predictive model which predicts the value of a single dependent variable based on the value of one or multiple independent variables. The process may be performed using any suitable computer known in the art, programmed in any suitable language known in the art, and having an operating system including, but not limited to, Windows 98, Windows NT, Windows 2000, Linux, and Sun OS.

The process of the present invention begins with the creation of a training dataset containing a plurality of observations. Each observation contains a value for the single dependent variable and preferably values for any number of independent variables. The training dataset is created from raw data. During the creation of the training dataset, business rules and sampling may be applied to reduce the number of data observations in the training dataset. A business rule is a logical statement that tests the condition of a dataset observation. A business rule can consist of one or more comparisons that test the value of different variables. Two or more comparisons can be combined with Boolean operators such as OR, AND, or NOT. Business rules are used to reduce the size of a raw data file by excluding observations that do not satisfy active business rules. Once the training dataset has been created, it may be stored in a memory device associated with a computer 100 or in a database in the computer 100, or both. Thereafter, one begins the process of creating an initial generation of chromosomes using the training dataset.

The process of the present invention is based on repeatedly evaluating a number of chromosomes 10 called a generation. The number of chromosomes 10 in a generation can be fixed or vary in some defined pattern. For example, in a fixed generation scenario, all generations are of the same size as the first or initial generation. Alternatively, in a variable generation scenario, one can start with a relatively large generation size and decrease to a target size over a given number of generations. Thereafter, one uses generations of the target size for all subsequent generations. This alternative requires more computer resources initially but the larger generations initially explore larger portions of the search space and can sometimes identify solutions sooner than would be the case using smaller generations.

It is an object of the present invention to create a process which explores all promising areas of a search space that might contain the best solution(s). This means searching the area represented by the observations in the training dataset for a model that best predicts values for the dependent variable. The method used to create the initial chromosome generation can affect the number of generations required to identify a satisfactory model. Therefore, a user can specify generation size as well as the method to be used to create the initial generation. The size of the initial generation is preferably based on input parameters. One can specify both an initial and a target generation size. By making the two sizes equal, one uses a fixed number of chromosomes for all generations.

In a preferred process in accordance with the present invention, either a random method or a distributed method is used to create the chromosomes 10 in the initial generation. The random method creates each chromosome 10 using random methods to select the genes' values within each observed variable segment 12. Similar methods are used to create the required number of interaction variable segments 14 by selecting observed variables, available operators, and include genes based on random selection. The chromosomes 10 thus produced have different numbers of active variables. It is possible that one or more variables will be inactive in all chromosomes.

The distributed method creates chromosomes 10 containing single variable models and creates two chromosomes 10 for each observed variable—one with a positive coefficient and one with a negative coefficient. The distributed method insures that all variables are represented in the initial generation. This method creates a generation with at least twice as many chromosomes as there are variables in the training dataset.

Each chromosome 10 created in the initial generation contains the elements of a predictive model and preferably has a fixed length. FIG. 1 illustrates the structure of a chromosome 10 in accordance with the present invention. As can be seen from this figure, each chromosome 10 has a plurality of observed variable segments 12 with each segment 12 comprising a group of genes describing an observed variable in the training dataset. In a preferred embodiment of the present invention, there is within each chromosome 10, a variable gene segment 12 for each variable in the training dataset. In other words, there are observed continuous variable segments 12' and observed categorical variable segments 12". Each chromosome 10 also contains a plurality of interaction variable segments 14 with each segment 14 being formed by a group of genes which describe a variable derived from two observed variables. The number of interaction variable segments 14 is set as a parameter for model development. For example, there can be 20 interaction variable segments per chromosome.

Each chromosome 10 further includes an intercept or bias gene 16. The intercept or bias gene 16 specifies the embedded model output when the variable components sum to zero. The intercept or bias gene 16 is located in the chromosome 10 after all interaction variable gene segments 14. It consists of 64 bits including 1 sign bit, 11 exponent bits, and 52 mantissa bits.

Each observed continuous variable segment 12' comprises the following genes—an include/exclude gene 18, a coefficient gene 20, a minimum outlier gene 22, a maximum outlier gene 24, a transformation gene 27, and a ranking gene 29. Each observed categorical variable segment 12" comprises the following genes—an include/exclude gene 18, a contrast gene 26, and one or more coefficient genes 20.

A continuous variable is a variable that can have any number of numeric values. Examples could be next week's stock price or a customer's account balance. A variable is classified as continuous if the number of values found in the dataset exceed the category cutoff parameter. A categorical variable is a variable having a limited number of unique values in a dataset. A binary variable is a special type of categorical that has only two possible values or categories. The category cutoff parameter specifies the maximum number of categories for a categorical variable. The number may range from 1 to 32 for example.

The include/exclude gene 18 plays an important role in the construction of each model. The include/exclude gene 18 limits the number of variables which are turned on for a particular model. Thus, if the data set has 1000 variables, each chromosome will include data about the 1000 variables; however, only a certain number of the variables, such as 10–20 will be turned on. This is done using a binary configuration for the include/exclude gene which consumes 1 bit where a "0" indicates a particular observed variable is turned off and a "1" indicates that a particular observed variable is turned on. Thus, for a particular observed variable gene segment 12, the include/exclude gene 18 indicates if the variable described by that segment is included in the embedded model. The include/exclude gene allows the process to determine the appropriate subset of variables within each solution space.

The coefficient gene 20 contains the coefficient value for the observed variable described by the variable segment and preferably comprises a plurality of bits such as 64 bits. Within these plurality of bits, there is a super bit consisting of multiple bits where if there is any change in these bits, i.e. one of the bits becomes flipped, they all flip. This helps optimize the model. The super bit may comprise any multiple selected bits in the 64 bits. The coefficient gene helps get rid of statistical estimation methods by embedding the coefficient into the gene.

Observed values for a continuous variable in the training dataset vary over a range defined by maximum and minimum values. When the range of values for a variable is large (the maximum and/or minimum differ greatly from the median value), a small number of extreme values can have a disproportionate effect on model development. In such cases, a more useful model can be developed by restating the extreme high or low values in an orderly fashion to values closer to the median. This technique is called trimming outliers. This is done to obtain a natural fit without any bias. The outlier genes 22 and 24 clean up records in the training dataset so they have the least bias on the predictions.

In the chromosome creation technique of the present invention, a maximum constraint between the median value and the maximum observed value and a minimum constraint between the median and minimum observed value are created. These constraint values represent a target range of values that is less than the actual range. Variable values that fall outside the constraint range are restated to have the nearest constraint value. As a result of the trimming process, the constraint values become the re-stated values for observed values in the trim areas.

The constraint values are developed by applying a ratio to the existing range of values to identify those values that need to be trimmed. A minimum trim ratio is applied to the difference between the median and the observed minimum value for a variable to determine the area where values are to be trimmed. A maximum trim ratio is applied in the same manner to the difference between the median and maximum value.

Figure 2:
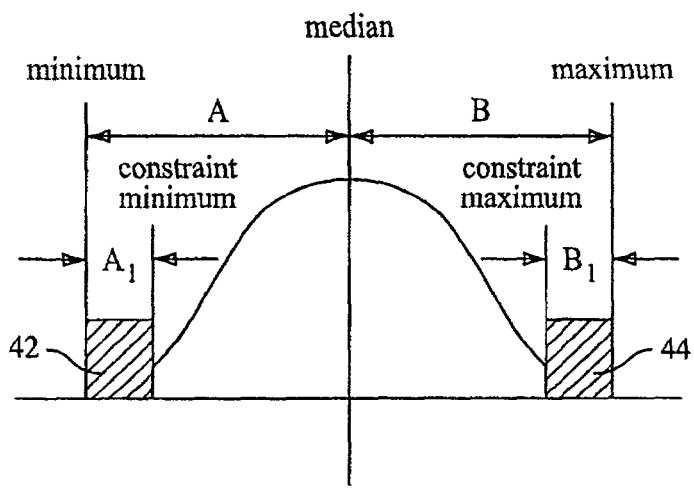
FIG. 2 is a schematic representation illustrating a trim process used in the process of the present invention.

FIG. 2 illustrates the trim concepts utilized in the present invention where $A_t$=min. trim ratio×A and $B_t$=max. trim ratio×B.

Both the numerator and the denominator of these ratios are defined as binary numbers with a number of precision bits specified for each requested model—a parameter called the number of outlier bits. The denominator of the trim ratio equals the maximum value of a binary number having the specified number of outlier bits. For example, a precision of 10 bits equals 1023 in decimal format. The numerator of each trim ratio is genetically derived.

Figure 3:
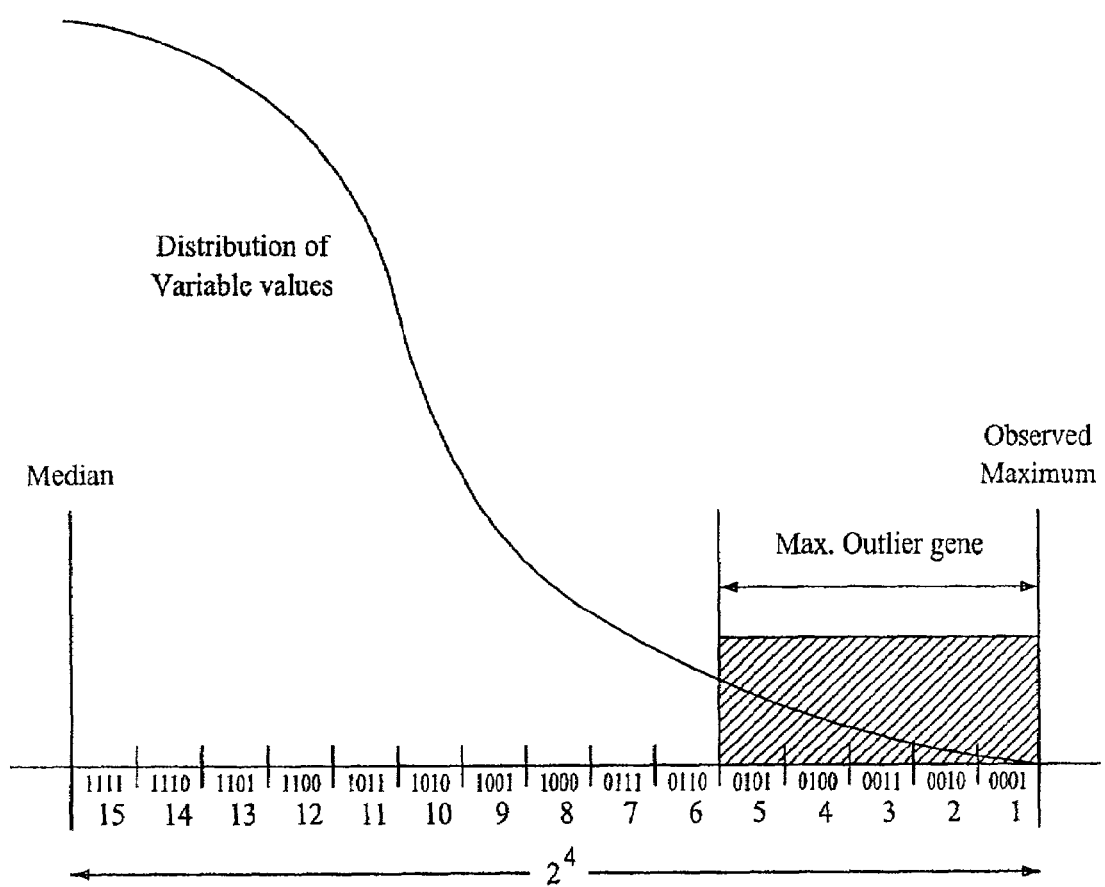
FIG. 3 is a graph illustrating a maximum range trim using 4 Outlier bits.

The maximum outlier gene 24 in a continuous variable segment contains the numerator of the maximum trim ratio. The minimum outlier gene 22 contains the numerator for a minimum trim ratio. FIG. 3 is a diagram illustrating a maximum trim scenario with 4 outlier bits. In this scenario, the maximum outlier gene is 5 (which in binary form is 0101) and the maximum value of a binary number having the specified number of 4 outlier bits is 15 (which in binary is 1111). The max. trim ratio is therefore 0101/111 (5/15). Thus 1/3 of the range from the median to the observed maximum is trimmed by the maximum outlier gene.

The outlier genes 22 and 24 in a continuous variable gene segment define the range of values over which trimming is done and that range of values used for the variable when determining fitness. The outlier genes 22 and 24 are represented in the chromosome 10 for each continuous variable as two stranded genes. The number of bits used to represent the genes 22 and 24 is dynamic for every application. The number of bits are defined at start-up and remain constant throughout generations of chromosomes, i.e. the number of bits used does not change per chromosome or per generation. The bits representing these genes are treated using true binary representation. It should be noted that outlier trimming is only applicable to continuous variables, not categorical variables.

In the process of the present invention, the user can specify the number of outlier bits and thereby control the number of units used to define the range of values. More bits allow trimming with more units and greater precision.

Figure 4:
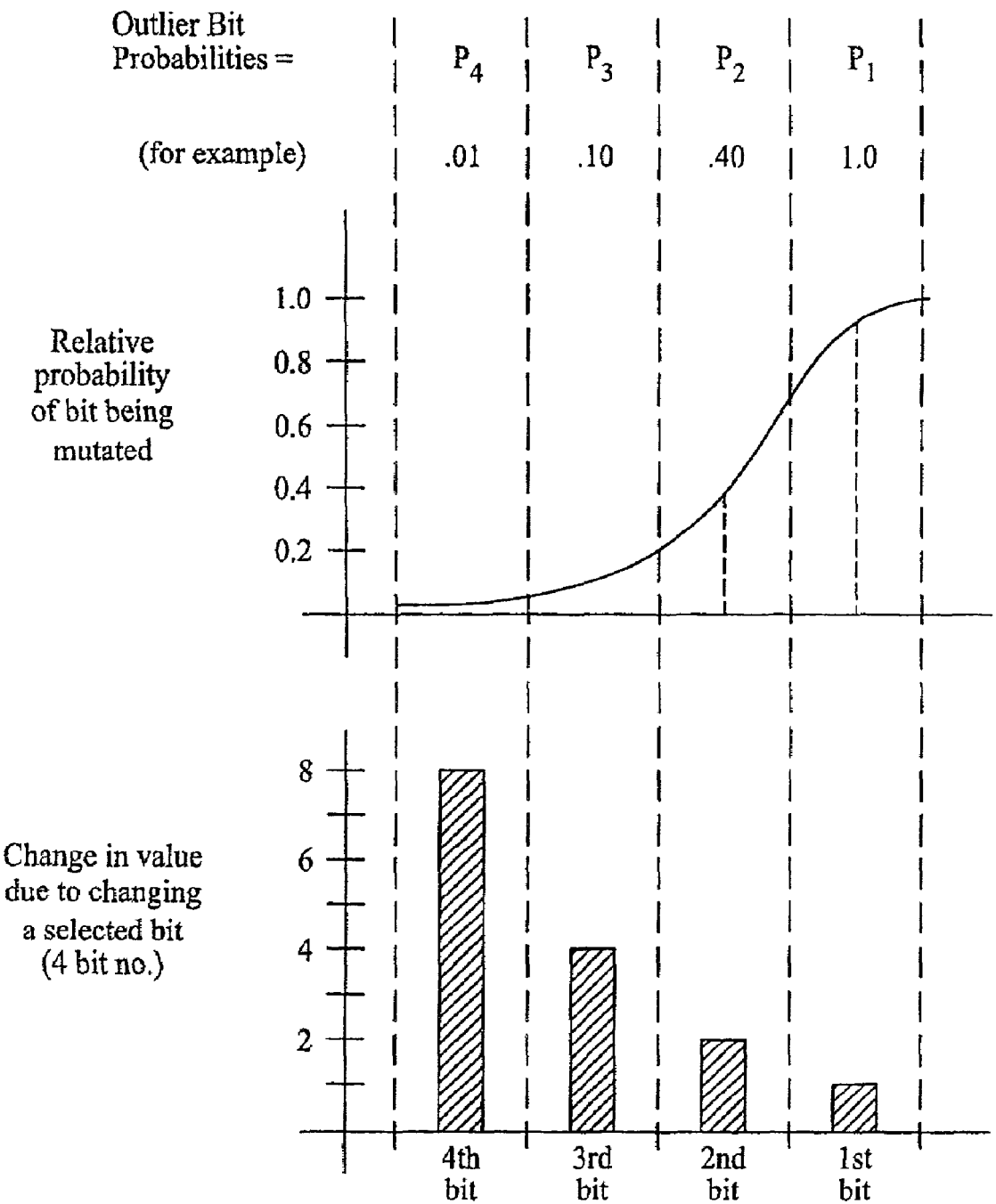
FIG. 4 is a graph showing outlier bit probabilities for a scenario with 4 outlier bits.

The other way to control the trim process is by specifying a mutation probability for each outlier bit. Each probability controls the likelihood that a particular bit is mutated. Setting a trim probability to 1.0 exposes that bit to the full likelihood of being flipped as a result of mutation. On the other hand, setting trim probability to a small value such as 0.01 or 0.001 makes it very unlikely the bit will be flipped by mutation. FIG. 4 illustrates how probabilities might be specified for a scenario with four outlier bits. It should be noted that the location of the fourth bit depends on the display convention since it is the most significant bit and the one that changes the overall value by the largest amount if changed because this avoids trimming too much.

The contrast gene 26 is used for variables classified as categorical and is used to automatically determine the optimal contrasts for the categorical variables. The contrast gene makes categorical variables useful in the analytical process by representing categorical variables intelligently and numerically to the analytical process of the present invention. As previously mentioned, a categorical variable has a limited number of unique values in the training dataset and the values have no significance that allows one value to be compared to another. Categorical variables are divided into two types—nominal and ordinal. Nominal variables, such as the race of a person, have no order, while ordinal variables have an order. A table associated with this gene determines how many binary variables or flags known as contrasts or indicators can be created out of a particular categorical variable. The contrast gene allows one to use information which is not otherwise usable.

The process of the present invention allows the user to control what variables are classified as categorical versus continuous variables via the category cutoff parameter. The process of the present invention assigns a binary number to each variable category with a specified number of bits. This coding scheme allows the system to create the subgroups called contrasts equal in number to the number of bits used for coding. By specifying a value for the parameter called maximum contrasts, the user specifies the maximum number of contrasts that can be created as binary codes in the binary code assigned to each category.

As can be seen from the foregoing, the process of the present invention uses the contrasts for a categorical variable as a type of variable and identifies those contrasts (variable values) that are useful in a predictive model. The system default values for maximum contrasts are developed based on an analysis of statistical significance and these values increase with the number of observations in the training dataset, but can be restated without changing the contrast gene usability.

The contrast gene 26 in a variable gene segment consists of contrast bit strings equal in number to the maximum categories allowed for a requested model as specified by the category cutoff parameter. The number of contrast bit strings actually used for a variable depends on the number of categories for that variable.

Figure 5:
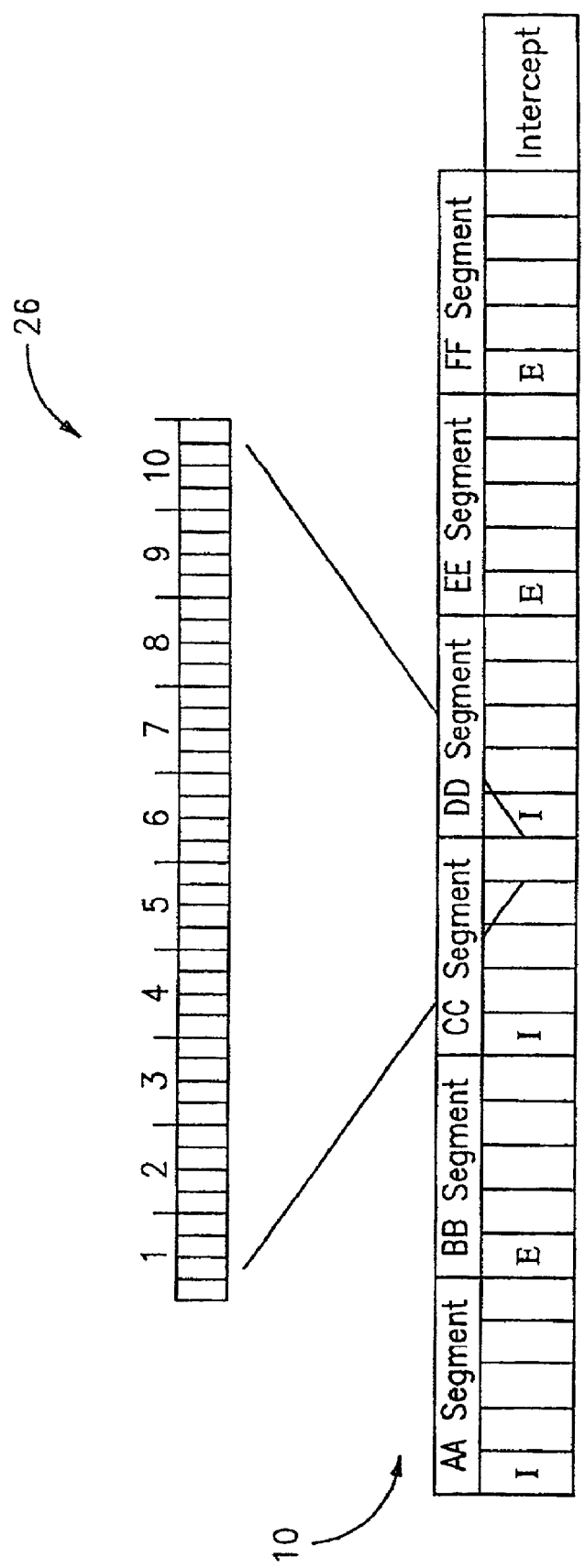
FIG. 5 is a schematic representation of a contrast gene with 4 contrasts and a category cutoff of 10.

For example, a requested model with a category cutoff of 10 and maximum contrasts of 4 would have a contrast gene made up of 10 strings of 4 bits in each categorical variable gene segment. Such a model is shown in FIG. 5. For a categorical variable having six values (categories) only the first six contrast strings are used in the associated variable segment.

The transformation gene 27 is used to eliminate skewness and kurtosis from a distribution relating to a particular observed variable and to transform the data distribution to provide maximum usability. The transformation gene 27 determines a value Y which defines the skewed data curve such as in the equation $x1=x^Y$. If the value of Y is determined to be 1, then no transformation is needed. If the value of Y is something other than 1, then a transformation is in order. At a value of zero, the natural log is performed. To determine the value of Y, one first determines the possible range (PR) for Y and the desired degree of precision. For example, if the desired precision is 10, the maximum binary value is 1023. The process then determines the value of the power transformation. To determine Y, the value of the chromosome is multiplied by the range of Y. The resulting number is then divided by the maximum binary value to determine an intermediate value. The minimum potential value for Y is then added to the intermediate value to determine the value of Y. Thus if the value of the chromosome is 750, the potential range for Y is 10 with the minimum value of Y being −5, and the maximum binary value is 1023, then $$Y=(10*(750/1023))-5=7.5-5=2.5.$$

In accordance with the present invention, the requirements and underlying assumptions for the transformation gene are that every continuous (non-categorical) variable will have a transformation gene. In order to apply the transformation gene, the following information must be present: minimum permissible power transformation, maximum permissible power transformation, and the number of bits to divide the power transformation range by. In addition, since a power transformation of one equals itself, there is no need for an on/off switch. All transformation genes are initialized to one, but are not limited to that.

The ranking gene 29 helps improve the predictability of the independent variable and applies only to continuous variables. This gene aids in the ranking and creation of fixed and variable width rankings for ordered variables. The ranking gene divides a variable distribution into a number of fixed width groups whose width is dictated by the user. The ranking gene includes a number of precision bits, such as 100 bits, and a number of consecutive bits, such as four bits, which tells us the boundaries for each group in the range. The number of boundaries which are found determines the number of variable width groups into which the variable distribution is ranked. The power of the ranking gene is that it can turn an unusable continuous distribution into useful or predictable information by creating a different distribution.

Each interaction gene segment 14 represents an interaction variable derived from two observed variables found in the training dataset. The value of an interaction term can be developed using one of six operators applied to two observed variables. Each interaction gene segment 14 consists of the following genes—an include/exclude gene 28, a coefficient gene 30, a first variable gene 32, an operator gene 34, and a second variable gene 36.

The include/exclude gene 28 in an interaction variable segment 14 is used in the same way as in the observed variable segment 12. This gene 28 indicates if the interaction variable described by the interaction gene segment 14 is included in the chromosome model. Those interaction variables included in the embedded model have the include/exclude gene set to the ON state.

The coefficient gene 30 contains the coefficient value for the interaction variable described by the interaction gene segment 14.

The first variable gene 32 identifies the first of two observed variables in the training dataset used to derive the value of the interaction variable.

The second variable gene 36 identifies the second of two observed variables in the training dataset used to derive the value of the interaction variable.

In a preferred embodiment of the present invention, the first and second variables used in the first and second variable genes 32 and 36 are randomly selected from the training dataset.

The operator gene 34 identifies the operator used to derive an interaction value from two observed variables. The operator may be addition (value is the sum of two observed variables), multiplication (value is the product of two observed variables), division (value is one variable divided by the second variable), subtraction (value is the mathematical difference between two observed values), difference squared (value is the square of the difference between two observed variables), or absolute difference (value is the absolute difference between two observed variables and the result is always positive or zero).

When the observed variables are categorical, the operators are applied to the index of each observed variable category/value.

Assume the following observed categorical variables are used to derive an interaction variable (IA Var02)

| Name | Variable Categories/Index | | | | | | | | |
|---|---|---|---|---|---|---|---|---|---|
| Var01 | | | | | | | | | |
| values | 9 | 9x | 9n | 10 | 10x | 10n | 11 | 11x | 11xx |
| index | 1 | 2 | 3 | 4 | 5 | 6 | 7 | 8 | 9 |
| Var 04 | | | | | | | | | |
| values | NE | SW | NW | SE | | | | | |
| index | 1 | 2 | 3 | 4 | | | | | |

If Var01 has a value of 10n and Var04 has a value of SW, then IA Var02=(6)*(2)=12. In the gene segment, this result is then multiplied by the coefficient value in the coefficient gene of IA Var02.

The number of interaction gene segments 14 added to the end of each chromosome 10 is either determined by a fixed parameter or applying a predetermined rule such as the square root of the number of variables in the training dataset.

The chromosomes 10 which have been created in the initial generation indicate how to build a statistical model as well as contain data used in the statistical model. It thus becomes desirable to determine how well each chromosome 10 in the initial generation acts as predictor.

Figure 6:
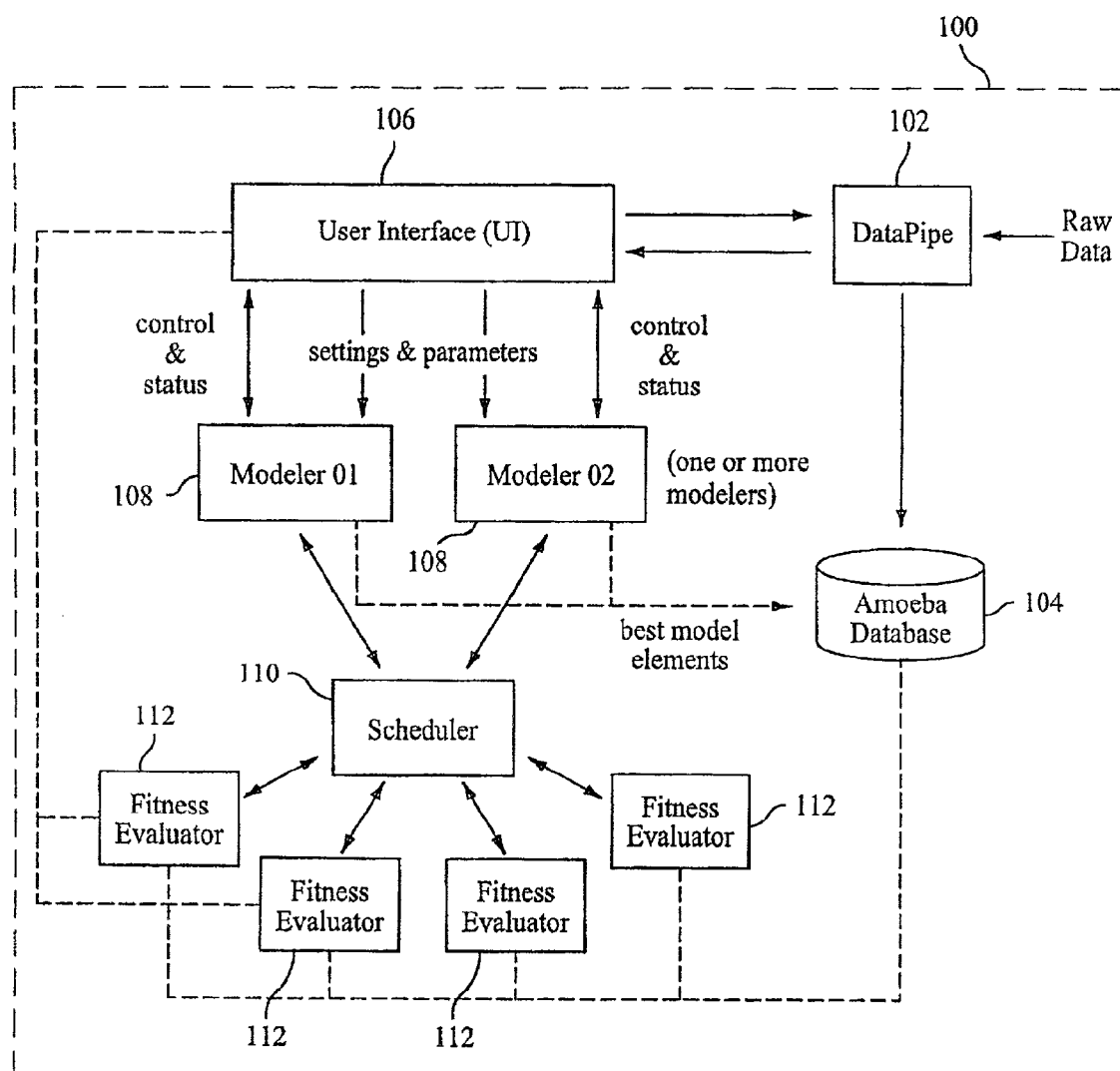
FIG. 6 is a schematic representation of a computer system for performing the process of the present invention.

Referring now to FIG. 6, the computer 100 is used to evaluate the ability of each chromosome 10 in the initial generation to predict an event or a model. To this end, the computer 100 includes a data pipe module 102 which receives raw data and a database 104. The database 104 contains all datasets for a requested model plus all model parameters set using a user interface component 106 (one user interface per user). The database 104 may incorporate a memory device (not shown) or be connected to a memory device. Stored within the database 104 are the training dataset, meta data, a validation dataset, parameters for a requested model, and best model elements. The computer 100 is further provided with at least one modeler module 108, preferably a plurality of modeler modules 108, a scheduler module 110, and a plurality of fitness evaluators 112. During model development, an assigned modeler module 108 and fitness evaluator 112 obtain required data from the database 104 and store elements of the best model in the database 104. The user interface component 106 obtains data from the database when preparing reports such as lift charts and classification tables or displaying elements of the best model.

Each modeler module 108 develops a predictive model in response to a model request from a user interface component 106. When a user submits a requested model for development, the system assigns the task to an idle modeler module 108. The system can have any number of modeler modules 108 based on the expected number of model requests active at any given time. The assigned modeler module 108 remains dedicated to the requested model until the specified number of generations are developed and evaluated. If the user specifies running continuously, the dedicated modeler module 108 is dedicated to the requested model until a user manually stops model development. Each modeler module 108 executes the process of the present invention by creating successive generations of chromosomes 10. The modeler module 108 sends each generation to the scheduler module 110 who sends them to the fitness evaluators 112 and receives the results that are then used to create the next generation.

The scheduler module 110 receives evaluation requests from all active modelers 108. Each request includes a generation of chromosomes for a requested model. As previously discussed, each chromosome 10 contains the elements of a predictive model that must be evaluated to determine how well that model predicts values for the dependent variable in the training dataset (a process called fitness evaluation). The scheduler module 110 coordinates the evaluation of chromosome generations created by all modelers. The scheduler sends each chromosome to an idle fitness evaluator 112. The fitness evaluator 112 develops the value for a user specified fitness metric. The fitness metric selected by the user may be percent correctly classified that can be used with a categorical dependent variable, a linear correlation which can be used with a continuous dependent variable, or an upper lift which is a fitness measure based on only the top quantiles of a generation. The fitness evaluator 112 returns the fitness metric to the scheduler module 110 and when values are received for all chromosomes in a generation, the scheduler module 110 returns the information to the requesting modeler 108.

Each fitness evaluator 112 applies the chromosome model to each observation in the associated training dataset to determine a predicted value for the dependent variable. Fitness evaluation compares the predicted and actual values for each observation and develops a single fitness metric that represents how well the predicted and actual values match across all observations in the training dataset. The system of the present invention can have any number of fitness evaluators 112. After completing the evaluation of a chromosome, the fitness evaluator 112 sends the fitness metric to the scheduler module 110 and becomes available to evaluate another chromosome from the same generation or another requested model.

Figure 8:
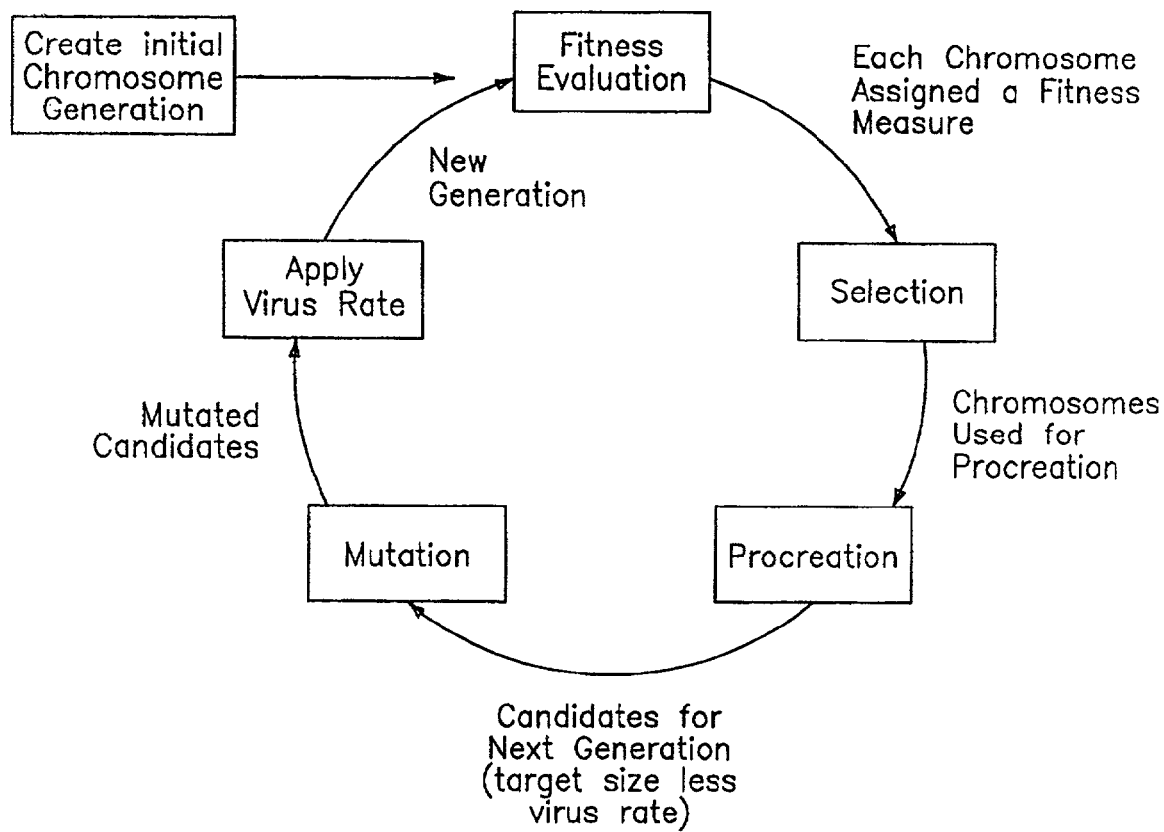
FIG. 8 is a flow chart illustrating the process of the present invention.

After the chromosomes 10 in the initial generation have been evaluated and assigned a fitness metric, a genetic algorithm is used by an assigned modeler module 108 in the computer 100 to create the next generation of chromosomes. The genetic algorithm involves the steps of selection, crossover, and mutation. FIG. 8 illustrates the process of the present invention to create an initial generation and successive generations.

The selection step identifies those chromosomes 10 in the initial generation which will be used to create the next generation of chromosomes. The selection of chromosomes is random and akin to a lottery wheel. While this selection is basically a random process, each chromosome 10 in the initial generation does not have an equal chance for selection. Each chromosome 10 in the initial generation is represented in the lottery by a weighted value that increases the chance of selection in proportion to the fitness measure assigned by the fitness evaluation.

The purpose of crossover is to produce candidate chromosomes for the next generation. The parameters which have been selected specify the target number of chromosomes in each generation and a virus rate. The virus rate determines the number of chromosomes (target number times the virus rate) in each generation that are created with a random process. Chromosomes introduced by the virus rate are not the result of selection, crossover, or any consideration of fitness.

A chromosome 10 selected for breeding, can be used in one of two ways—cloning or pure (standard) crossover. A crossover rate may be set by the user to control the proportion used for each type of crossover. For example, a 70% crossover rate means 70% of selected chromosomes are used to create offspring through a crossover process and the remaining 30% are used for simple cloning. The cloning process creates a chromosome for the new generation that is a duplicate of a chromosome selected from the current generation.

Figure 7:
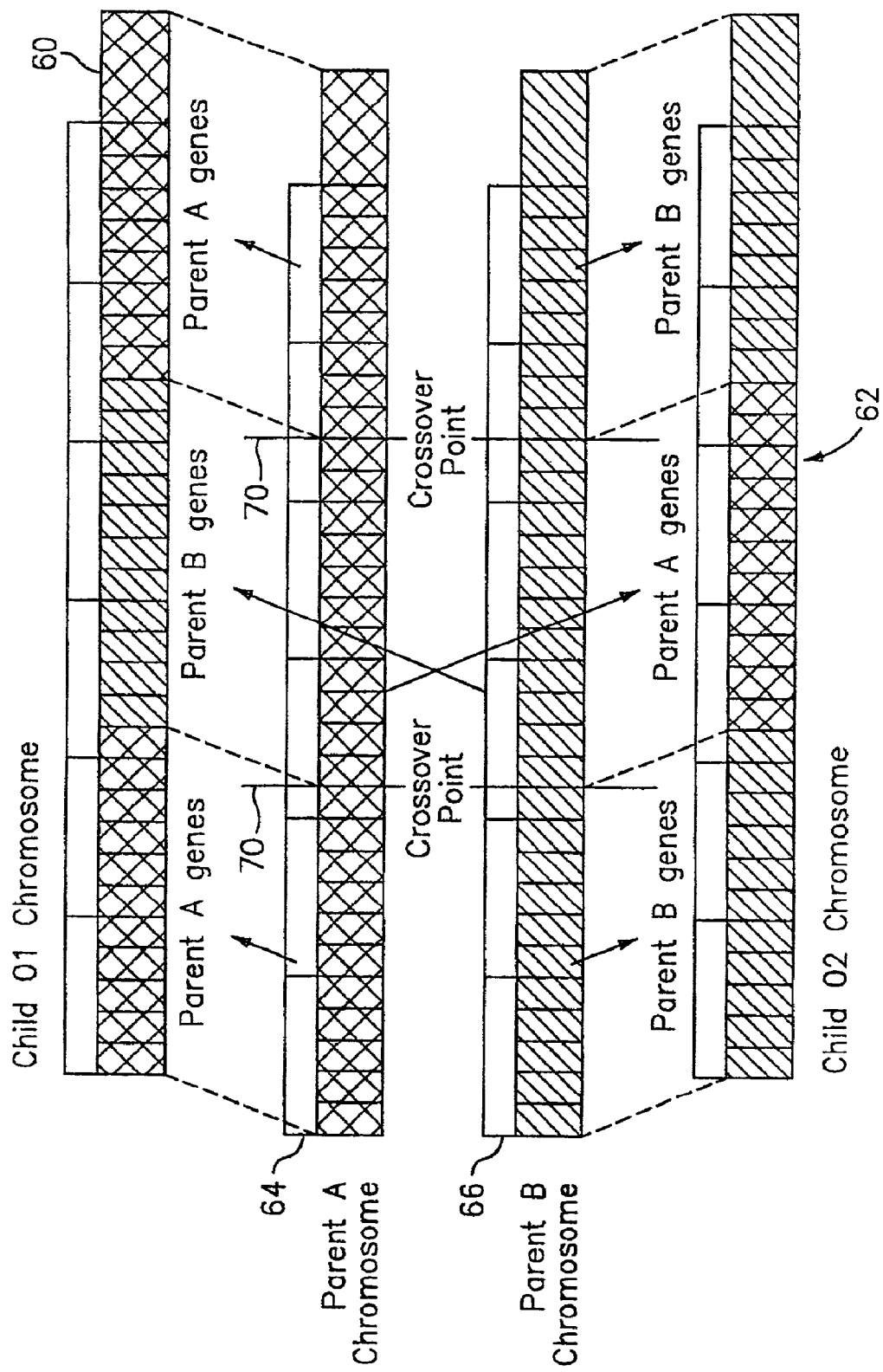
FIG. 7 is a schematic representation of a crossover process used in the process of the present invention.

The crossover process creates two offspring chromosomes 60 and 62 for the next generation based on two selected parent chromosomes 64 and 66 as shown in FIG. 7. The process uses genes from each parent to create each of the offspring chromosomes.

A user controls the crossover process by specifying a number of crossover points 70 or selecting a uniform crossover process. When one specifies a number of crossover points 70, the system of the present invention places each point at a random location in the chromosome. The crossover points 70 define blocks of genes that are exchanged to create a child. FIG. 7 shows how offspring are created with two crossover points.

The crossover process creates an offspring by taking genes from one parent up to the first crossover, and taking genes from the other parent between the first and second crossover points. Genes from the first parent are taken between the second and third crossover points. This alternating process can continue for any number of crossover points.

The uniform crossover process uses every possible point in a chromosome as a crossover point. Instead of alternating the use of gene blocks, the system uses a random process to determine if genes from the other parent will be used for the next block. For a chromosome with many genes, crossover (using a gene from the other parent) occurs at half the eligible crossover points.

Crossover points can occur at any point in a variable gene segment. For any variable, a child can have the include/exclude gene from one parent and the coefficient gene from the other parent. The active variables in a child chromosome (created with crossover) must be active in one of the parents but the overall set of active variables will likely be different from either parent.

The chromosomes created by breeding (cloning and crossover) are considered candidates for the next generation and subjected to mutation. Mutation is a random process that reverses selected bits in the candidate chromosomes based on the probability value entered as the mutation rate. During mutation, bits are randomly flipped within the chromosomes in order to insure diversity within a generation. It should be noted that selected bits in the Outlier genes can be protected from mutation by assigning relatively small outlier bit probabilities.

As mentioned above, the virus rate determines the number of chromosomes created with a random process. The system uses a random process to create the number of chromosomes that equals the virus rate applied to the desired population size. The remaining chromosomes in the generation are created through crossover. Because the chromosomes introduced by the virus rate are created without regard to fitness measures or any other characteristic of the current generation, they tend to introduce diversity into a new generation that explores new areas of a search space. Increasing the virus rate tends to explore new areas while decreasing the rate tends to fine tune the best models already attained.

After the next generation has been created, each chromosome in the next generation has its fitness evaluated as before. Following the fitness evaluation, the genetic algorithm is applied to the next generation of chromosomes as discussed above to create a new generation of chromosomes. This iterative process of chromosome creation, evaluation, and next generation chromosome creation continues within one of the computer 100 until the user stops the process.

One of the advantages to the process of the present invention is that improvements are found in each generation of chromosomes. Still another advantage to the process of the present invention is that it significantly reduces human errors and improves the ability to create a predictive model. Yet another advantage to the process of the present invention is that it can be used in a wide variety of business settings to predict a wide range of helpful models. Still another advantage to the process of the present invention is that the gene mapping employed in the process to form each chromosome reduces the probability of not selecting the right combination of variables to almost zero.

It is apparent that there has been provided in accordance with the present invention a process and a system for developing a predictive model which fully satisfies the objects, means and advantages set forth hereinbefore. While the present invention has been described in the context of specific embodiments thereof, other alternatives, modifications, and variations will become apparent to those skilled in the art having read the foregoing description. Therefore, it is intended to embrace those alternatives, modifications, and variations as fall within the broad scope of the appended claims.

What is claimed is:

1. A computer implemented process for developing a model for business applications which predicts the value of a single dependent variable based on the value of at least one independent variable comprising the steps of:
   (a) providing a dataset containing a plurality of observations each containing a value for said dependent variable and values for said at least one independent variable;
   (b) creating from said dataset of an initial generation of chromosomes each comprising a predictive model, said chromosome creating step comprising forming a chromosome having a plurality of observed variable segments each formed by a plurality of genes, a plurality of interaction segments each formed by a plurality of genes, and an intercept gene positioned after said plurality of interaction segments;
   wherein each interaction segment consists of the following genes—an include/exclude gene, a coefficient gene, a first variable gene, an operator gene and a second variable gene;
   (c) determining a quantitative fitness measure for each chromosome in said initial generation; and
   (d) creating a next generation of chromosomes by selecting a number of chromosomes from said initial generation, crossing said selected chromosomes by at least one of a cloning and a crossover technique, and mutating said chromosomes.

2. A process according to claim 1, further comprising (e) determining new fitness measures for said chromosomes in said next generation, and (f) repeating said selecting, crossing and mutating steps to create a successive generation of chromosomes.

3. A process according to claim 2, further comprising continuously repeating steps (e) and (f) for said successive generation of chromosomes to create another successive generation of chromosomes.

4. A process according to claim 1, wherein said initial generation chromosome creating step is performed using a random method.

5. A process according to claim 1, wherein said initial generation chromosome creating step is performed using a distributed method.

6. A process according to claim 1, further comprising limiting the number of interaction segments in each said chromosome to a fixed parameter or applying a predetermined rule to determine the number of interaction gene segments.

7. A process according to claim 1, wherein said chromosome forming step comprises forming at least one observed continuous variable gene segment so as to contain an include/exclude gene, a coefficient gene, a minimum outlier gene, a maximum outlier gene, a transformation gene, and a ranking gene.

8. A process according to claim 7, further comprising forming a plurality of observed continuous variable gene segments and using said include/exclude gene to indicate whether a variable for a particular one of said observed continuous variable segments is included in an embedded model.

9. A process according to claim 8, further comprising using said coefficient gene to identify a coefficient value for an observed continuous variable described by the particular one of said observed variable segments.

10. A process according to claim 9, further comprising forming said coefficient gene from a plurality of binary bits and designating a number of said binary bits as a super bit where all of said bits flip under certain conditions.

11. A process according to claim 9, further comprising using said outlier genes in each said observed continuous variable segment to trim a distribution range for the observed value in said observed continuous variable segment.

12. A process according to claim 11, further comprising representing said outlier genes in a double stranded format.

13. A process according to claim 11, further comprising using said transformation gene to eliminate skewness and kurtosis from a distribution range for said observed variable in said observed continuous variable segment and to transform said distribution range as close as possible to normality.

14. A process according to claim 1, wherein said chromosome forming step comprises forming at least one observed categorical variable segment consisting of an include/exclude gene, a contrast gene, and at least one coefficient gene.

15. A process according to claim 14, further comprising forming a plurality of observed categorical variable segments and using said include/exclude gene to indicate whether a variable for a particular one of said observed categorical variable segments is included in an embedded model.

16. A process according to claim 15, further comprising using said coefficient gene to identify a coefficient value for the observed categorical variable described by the particular one of said observed variable segments.

17. A process according to claim 16, further comprising forming said coefficient gene from a plurality of binary bits and designating a number of said binary bits as a super bit where all of said bits flip under certain conditions.

18. A process according to claim 14, further comprising using said contrast gene to indicate a maximum number of categories allowed for a requested model.

19. A process according to claim 1, further comprising using said include/exclude gene to indicate if a particular interaction variable described by a particular interaction segment is included in the model.

20. A process according to claim 19, further comprising using the coefficient gene to indicate a coefficient value for the interaction variable described by a particular interaction segment.

21. A process according to claim 20, further comprising using said first variable gene to identify a first observed variable used to derive a value of the interaction variable.

22. A process according to claim 21, further comprising using said operator gene to select an operator used to derive an interaction value from two observed variables.

23. A process according to claim 22, wherein said operator is selected from the group consisting of addition, multiplication, subtraction, difference squared, division, and absolute difference.

24. A process according to claim 22, further comprising using said second variable gene to identify a second of two observed variables used to derive the value of the interaction variable.

25. A process according to claim 24, further comprising randomly selecting said first and second variable genes in each of said interaction segments.

26. A computer implemented process for developing a model for business applications which predicts the value of a single dependent variable based on the value of at least one independent variable comprising the steps of:
(a) providing a dataset containing a plurality of observations each containing a value for said dependent variable and values for said at least one independent variable;
(b) creating from said dataset of an initial generation of chromosomes each comprising a predictive model, said chromosome creating step comprising forming a chromosome having a plurality of observed variable segments each formed by a plurality of genes, a plurality of interaction segments each formed by a plurality of genes, and an interceptor gene positioned after said plurality of interaction segments;
wherein each interaction segment consists of the following genes—an include/exclude gene, a coefficient gene, a first variable gene, an operator gene and a second variable gene;
(c) determining a quantitative fitness measure for each chromosome in said initial generation;
(d) creating a next generation of chromosomes by selecting a number of chromosomes from said initial generation, crossing said selected chromosomes by at least one of a cloning and a crossover technique, and mutating said chromosomes; and
said fitness measure determining step comprising providing a scheduler module and a plurality of fitness evaluator modules and using said scheduler module to direct one of said chromosomes in said generation to be measure to an available one of said evaluator modules.

27. A process according to claim 26, wherein said fitness measure determining step comprises selecting a fitness metric and determining a fitness rating for said one chromosome using said fitness metric.

28. A process according to claim 26, further comprising providing at least one modeler module, accumulating a fitness measure for each said chromosome in said scheduler module, and transmitting said accumulated fitness measures from said scheduler module to said at least one modeler module.

29. A process according to claim 28, further comprising performing said new generation chromosome creating step using said at least one modeler module.

30. A process according to claim 29, further comprising weighting each said chromosome in said generation and said selecting step comprising randomly selecting said weighted chromosomes.

31. A process according to claim 30, wherein said procreated step comprises selecting a crossover rate and a number of crossover points and creating two offspring chromosomes from two selected parent chromosomes using said selected crossover rate and said crossover points.

32. A system for creating a predictive model for business applications comprising:
means for creating an initial generation of chromosomes from a dataset with each chromosome in said initial generation comprising a predictive model, said chromosome creating step comprising forming a chromosome having a plurality of observed variable segments each formed by a plurality of genes, a plurality of interaction segments each formed by a plurality of genes, and an interceptor gene positioned after said plurality of interaction segments;
wherein each interaction segment consists of the following genes—an include/exclude gene, a coefficient gene, a first variable gene, an operator gene and a second variable gene;
means for determining a quantitative fitness measure for each chromosome in said initial generation;
means for selecting a number of said initial generation chromosomes, for crossing the selected initial generation chromosomes by at least one of a cloning and a pure (standard) crossover technique, and for mutating the crossed chromosomes into a next generation of chromosomes; and
a computer and said initial generation chromosome creating means comprising at least one modeler module within said computer.

33. A system according to claim 32, further comprising a scheduler module in said computer and at least one fitness evaluator in said computer forming said means for determining a quantitative fitness measure.

34. A system according to claim 33, further comprising a plurality of fitness evaluators in said computers and said scheduler module determining which of said plurality of fitness evaluators shall determine the fitness measure for a particular one of said chromosomes.

35. A system according to claim 32, wherein said at least one modeler module also forms said means for selecting a number of initial generation chromosomes, for crossing the selected initial generation chromosomes, and for mutating the crossed chromosomes.

36. A system according to claim 32, further comprising a user interface module.

37. A system according to claim 32, further comprising a database within said computer for storing datasets and best predictive models and said at least one modeler module communicating with said database.

38. A chromosome for predicting a model for business applications comprising a plurality of observed variable segments, a plurality of interaction segments and an intercept gene and further comprising said intercept gene being positioned on said chromosome after said plurality of interaction segments;
wherein each interaction segment consists of the following genes—an include/exclude gene, a coefficient gene, a first variable gene, an operator gene and a second variable gene.

39. A chromosome according to claim 38, wherein said plurality of interaction segments is limited in number to a preset value or by a predetermined rule.

40. A chromosome according to claim 38, wherein said observed variable segments contain at least one observed continuous variable segment comprising an include/exclude gene, a coefficient gene, a minimum outlier gene, a maximum outlier gene, a transforming gene, and a ranking gene.

41. A chromosome according to claim 40, wherein each of said outlier genes is represented in a double stranded format.

42. A chromosome according to claim 38, wherein said observed variable segments contain at least one observed categorical variable segment comprising an include/exclude gene, a contrast gene, and at least one coefficient gene.

43. A chromosome according to claim 38, wherein each of said first and second variables is randomly selected from a number of variables in a dataset.

* * * * *